United States Patent
Manno

(10) Patent No.: US 7,707,222 B2
(45) Date of Patent: Apr. 27, 2010

(54) METHOD AND APPARATUS FOR PROVIDING ACCESS TO INFORMATION SYSTEMS VIA E-MAIL

(75) Inventor: Michael J. Manno, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 508 days.

(21) Appl. No.: 11/879,522

(22) Filed: Jun. 26, 2007

(65) Prior Publication Data

US 2009/0292670 A1    Nov. 26, 2009

Related U.S. Application Data

(60) Provisional application No. 60/832,008, filed on Jul. 6, 2006.

(51) Int. Cl.
*G06F 17/30* (2006.01)

(52) U.S. Cl. .................. 707/781; 707/769; 709/206; 713/161; 715/209

(58) Field of Classification Search .............. 707/3, 707/9, 10, 102, 729, 781; 709/206, 207, 709/225; 705/21, 26; 713/161; 715/209
See application file for complete search history.

(56) References Cited

U.S. PATENT DOCUMENTS

| | | | | |
|---|---|---|---|---|
| 5,890,163 A * | 3/1999 | Todd | ........................... | 707/200 |
| 5,978,817 A * | 11/1999 | Giannandrea et al. | ....... | 715/207 |
| 6,526,413 B2 * | 2/2003 | Schwitters et al. | ....... | 707/104.1 |
| 6,807,585 B2 * | 10/2004 | Kovacevic | ..................... | 710/5 |
| 7,516,094 B2 * | 4/2009 | Perkowski | ................... | 705/27 |
| 2002/0099719 A1 * | 7/2002 | Schwitters et al. | ....... | 707/104.1 |
| 2002/0194081 A1 * | 12/2002 | Perkowski | ................... | 705/26 |
| 2003/0172292 A1 * | 9/2003 | Judge | ......................... | 713/200 |
| 2006/0029191 A1 * | 2/2006 | Miller et al. | ............ | 379/88.13 |
| 2006/0217990 A1 * | 9/2006 | Theimer et al. | ................ | 705/1 |
| 2006/0253447 A1 * | 11/2006 | Judge | ........................... | 707/9 |

* cited by examiner

*Primary Examiner*—Shahid A Alam

(74) *Attorney, Agent, or Firm*—Joseph A. Mancini

(57) ABSTRACT

Invention provides a method for an e-mail based interface to function as a single common access point for requesting, receiving, publishing, accessing and sharing various data from multiple, remote information systems. The invention becomes akin to a human relay operator in the loop which is transparent to the user. By relaying the e-mail chain, the invention performs multiple functions based on the originating request, and reply as a human would.

2 Claims, 8 Drawing Sheets

Combined subject line becomes:

/FormSearchedOn(Field1,Field2,Field3....)

FIGURE 6

METHOD AND APPARATUS FOR PROVIDING ACCESS TO INFORMATION SYSTEMS VIA E-MAIL

PRIORITY CLAIM UNDER 35 U.S.C. §119(e)

This patent application claims the priority benefit of the filing date of a provisional application Ser. No. 60/832,008, filed in the United States Patent and Trademark Office on Jul. 6, 2006.

STATEMENT OF GOVERNMENT INTEREST

The invention described herein may be manufactured and used by or for the Government for governmental purposes without the payment of any royalty thereon.

BACKGROUND OF THE INVENTION

Electronic mail or "E-mail" is a store and forward method of sending and receiving messages over an electronic communication system, and is typically perceived as an infrastructure connecting people through a human interface means at both ends. E-mail messages may contain text, files, and even images. But what if an e-mail user desired to "pull" rather than "push" information from another computer?

The existing e-mail infrastructure provides a foundation to expand upon beyond the traditional uses of e-mail systems. Applying automation and intelligence that would allow e-mail messages to contain data opposed to just message text, is an open and challenging problem in support of data sharing and information collection needs which the prior art has not adequately addressed.

Referring to FIG. 1, before the widespread use of the internet, there were attempts to use e-mail to access the internet. These methods provided a text only representation of a webpage that was delivered in an e-mail message (see). To enter data back into any form fields, the user had to find where to enter the information, send the request back to the webpage to retrieve the results, and then view the results. That required, to do an internet search, or get a weather forecast, the user would first have to have the page e-mailed to them, then determine how to enter the data in the returned page, send the message back, and decipher the results.

Still referring to FIG. 1, one problem with this prior art method of accessing the internet over e-mail is that the process becomes confusing to the user who is requesting information. A second problem is that the domains are not data specific. That means if a particular piece of information is needed from a particular source that is known, it is desirable to retrieve the data directly from that source. A third lies in the fact that the results are formatted based on the provider, not the requestor. Therefore, when sending a request, the results are returned in a format that may not format well in an e-mail message.

In light of the aforementioned deficiencies in the prior art, it would therefore be desirable to transform the data into a format that would appear legible in an e-mail message. Lastly, there are no specific ways to upload or submit information directly into specific sources. It would be desirable to not only request information from a particular source, but to contribute as well. To date, the prior art has not addressed this need in this manner.

OBJECTS AND SUMMARY OF THE INVENTION

One object of the present invention is to provide a method and apparatus for an e-mail based interface which provides a single common access point using e-mail, to request, receive, publish, share, and access data from a plurality of information system types.

Another object of the present invention is to provide a method and apparatus for small devices such as cell phones, to publish or subscribe to various information systems without the need to install complex systems.

Yet another object of the present invention is to provide a method and apparatus for providing access to multiple information systems employing a means that can be delivered, installed, or run independently of an e-mail application itself.

The invention disclosed herein provides a method and apparatus for delivering data using e-mail. In particular, this invention becomes an operator in an e-mail loop, whereas the messages are sent from human to machine, then machine back to human. By relaying the e-mail chain, the system can perform multiple functions based on the originating request, and reply as a human would. An e-mail can be sent asking for a particular piece of information, for example, weather. The invention receives this request, makes the necessary connections and retrieves the requested information. The invention will then respond to the e-mail, from the machine back to the human with, in this example, the weather forecast. From the human perspective, the message in reply appears as if it had come from another human.

According to an embodiment of the present invention, an independent e-mail server is installed on a machine. This machine also connects to other machines using Application Programmers Interfaces, or API's comprised from the following steps: An e-mail is sent to the mail server. The message is then passed to another program which identifies the message headers. Based on the request, the program makes the corresponding connections where the data is located, retrieves the information, and wraps the results into an outgoing e-mail message. The message is then sent back to the originating requestor.

According to a feature of the present invention, a method is provided to access multiple information systems using electronic forms. Typical e-mail transfers contain standard headers such as To, From, Subject, etc. When custom forms are introduced, the field names, or header fields on the form are necessarily generated by the programmer. Since most e-mail systems will not understand information beyond the standard header information, there is no way to guarantee the additional data will be delivered with the e-mail. Moreover, outside the native e-mail environment, most scripting languages used in the forms are stripped. This results in any variable, or calculations will be lost. Therefore, to uniquely guarantee the additional fields are delivered with the e-mail, the present invention provides for additional fields that are created and are modulated with the standard headers. When the message is received, the headers are again parsed, and formatted back into an understandable message body. This modulation and demodulation provided by the present invention is completely transparent to the user.

Advantages And New Features Of The Present Invention

In contrast to the way information has been accessed and delivered in the past, the present invention becomes the equivalent of an operator in the loop. In other words, the translation that takes place is also a transformation of the data. Employing the present invention's operator in the loop method allows a user to perform a search without first returning the webpage, or search engine. For example, if a user wanted to perform an internet search but did not have access to the internet, an e-mail can be sent directly to the present invention with the desired search terms contained in the message body. The present invention takes the message body, and passes search terms in accordance with the specified request as defined in the subject line of the e-mail, in this case, an internet search. The results are then formatted and returned within an understandable message body, as opposed to just a text representation of the webpage.

The advantage of this relay/proxy method of accessing the internet is that the request does not go out directly to the source. Instead, the request is sent to another machine, which makes the actual request and replies back. The advantage of such a process allows the users of the system to configure how/where the data will be searched, and how the results will be displayed.

For example, suppose that deployed troops during wartime required access to the right information, at the right time. Concurrently, this information would need to be shared and stored. Deploying troops each with a laptop computer with the sole purpose of being able to access and publish data is not feasible due to the high cost, weight, shortened battery life, and the size of these devices. However, cellular phone technology supports internet and e-mail access. These devices are much smaller, less expensive, and are already established in the wartime environment. In this fashion, the present invention would be capable of assisting the accessing and publishing information in a way that would provide a large benefit for our military.

BRIEF DESCRIPTION OF THE DRAWINGS

FIG. 6 depicts an actual screenshot of the present invention's multiple field form.

DETAILED DESCRIPTION OF THE PREFERRED EMBODIMENT

This invention allows simple e-mail devices to retrieve, compile and publish data from multiple, remote information systems.

Figure 1:
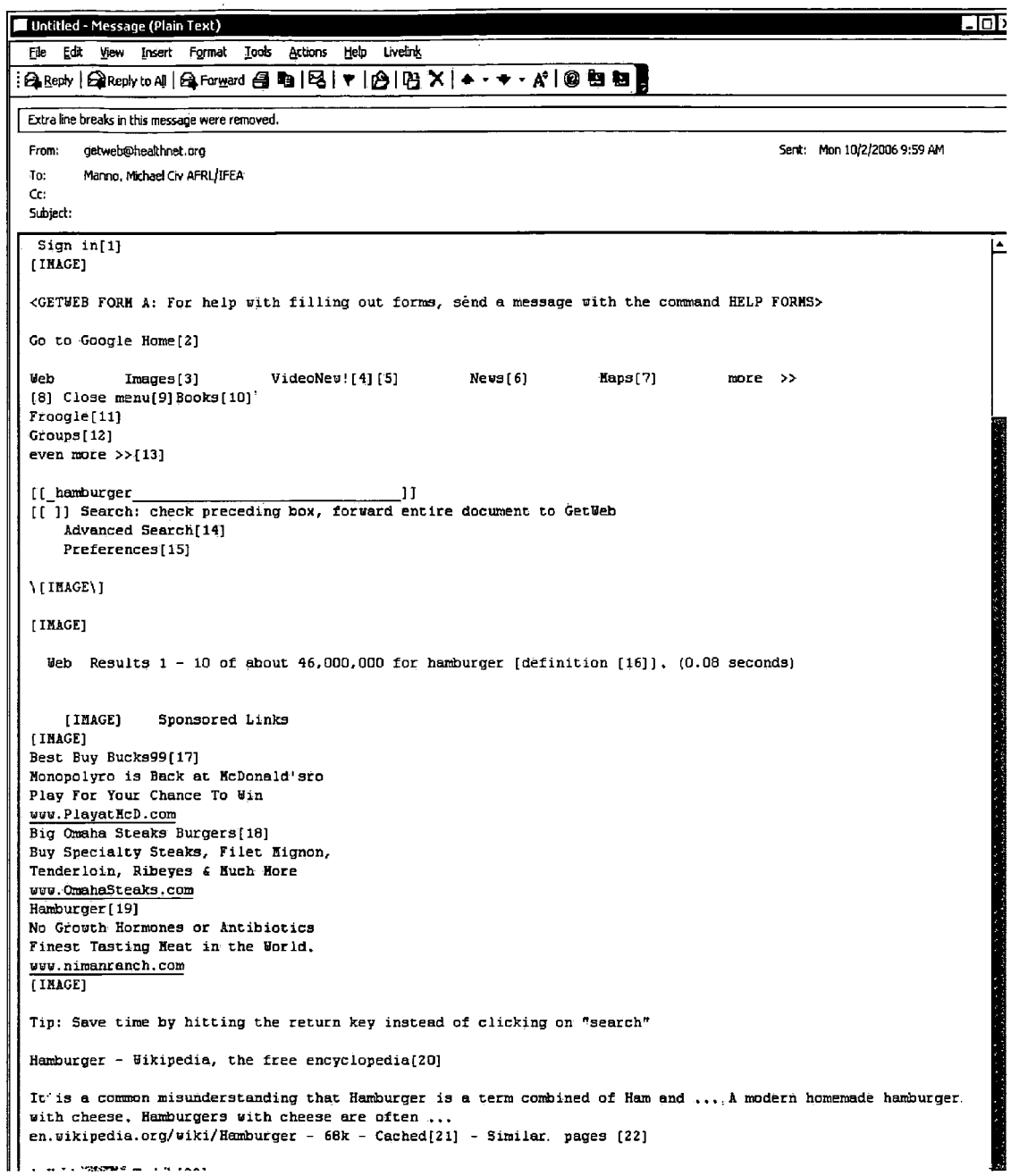
FIG. 1 depicts a prior art system for accessing a search engine via e-mail.
Figure 2:
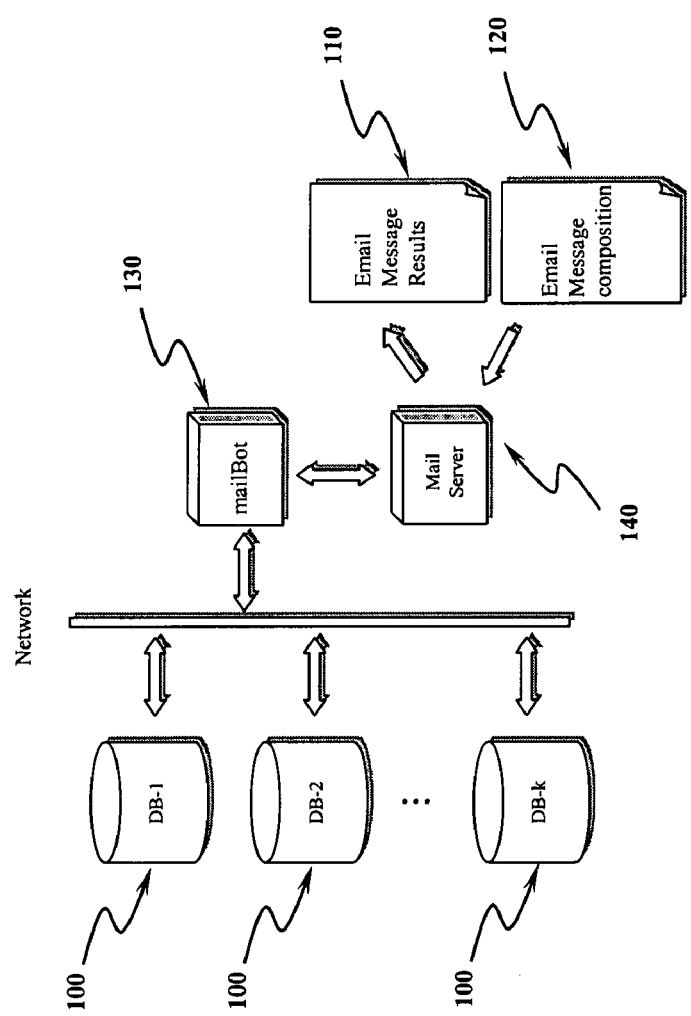
FIG. 2 depicts the extraction of information from multiple databases via a mail server, fusion of the results, and creation of a synthetic document using the present invention.

Referring to FIG. 2 depicts the interaction of the present invention 130 with multiple remote information sources or databases 100 and e-mail servers 140. Requests for information are made through the mail server 140 using forms 120 (see FIG. 4 and FIG. 6) into which search terms are entered. The e-mail server 140 communicates the form 120 to the invention 130. The invention 130 performs the extraction of information from the multiple databases 100 via the e-mail server 140, provides fusion of the results, and creates a synthetic document 110 which is output to the user.

Figure 3:
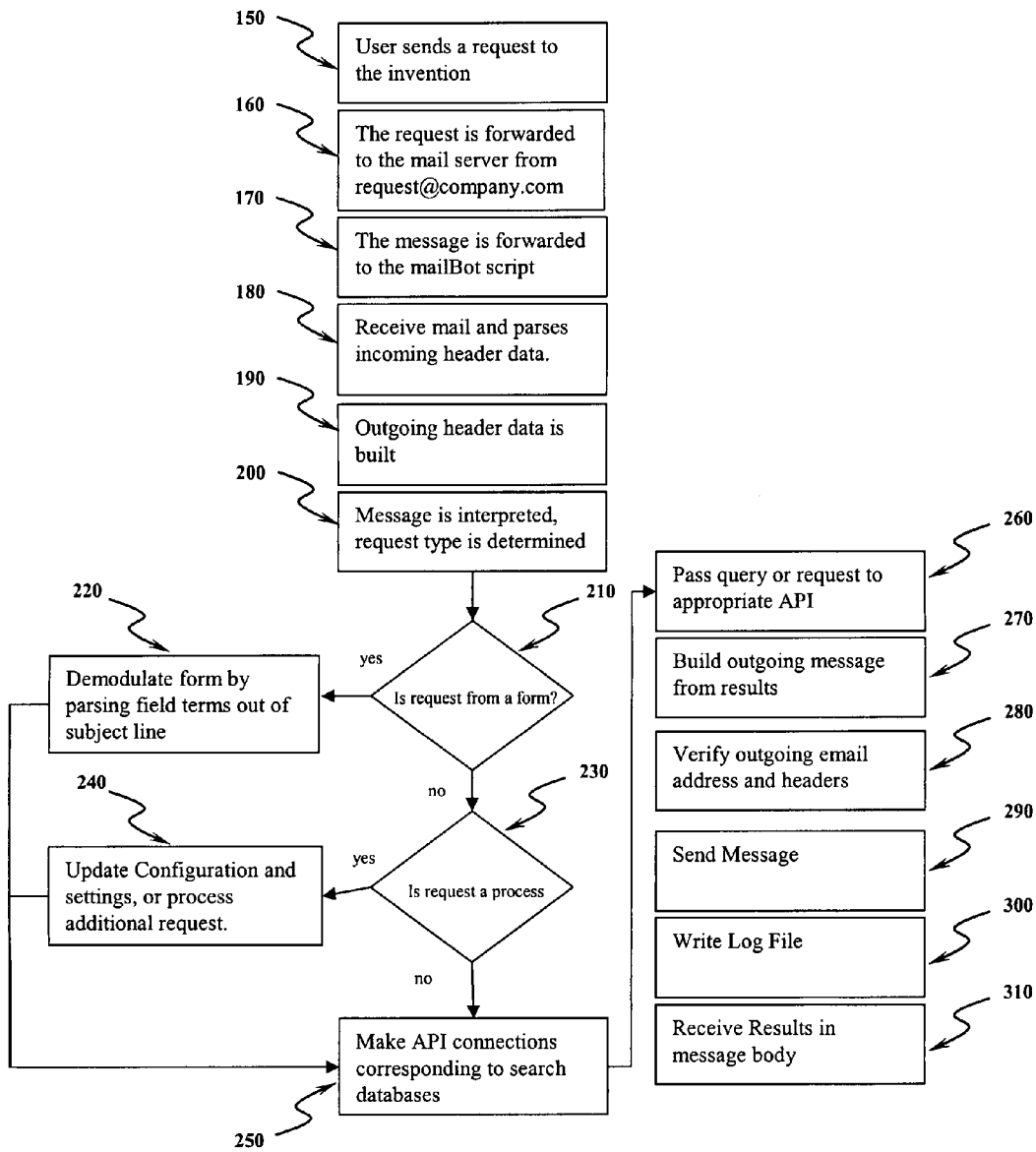
FIG. 3 depicts a flowchart detailing the process steps for requesting and receiving information using an e-mail system as provided by the present invention.

Referring to FIG. 3, the process steps by which a new information request via e-mail is conducted are depicted. The request originates by sending an e-mail directly to an e-mail address with the subject line the type of request, and the message body the parameters of the request 150. The e-mail address that the request is sent to is set up by the domain. For example, an organization with the domain "foobar", will set up an e-mail account invention@foobar.com. When an e-mail is sent to this address, the message will be forwarded to the mail server 160. This allows for a simple static e-mail address within the organization to be defined regardless of where the e-mail server resides. An e-mail message in itself can not be processed, so the message must now be forwarded from the mail server to a script or program that is capable of parsing out the e-mail headers and the message body 170. Once the script receives the message, the header information is parsed and each e-mail header is stored in a temporary variable 180. Based on the incoming headers, the outgoing header data is produced or "built" at this point 190. The purpose of accurate header information is to prevent e-mail filters from trapping and labeling the reply as spam, or unwanted e-mail. The script decides the next step in the process based on the user request. The incoming request either originated from a text only e-mail, an e-mail form, or a process e-mail and the invention must interpret it and determine the type of request. 200 If it is determined that the incoming request originated from a form 210, then the form needs to be demodulated 220.

Figure 4:
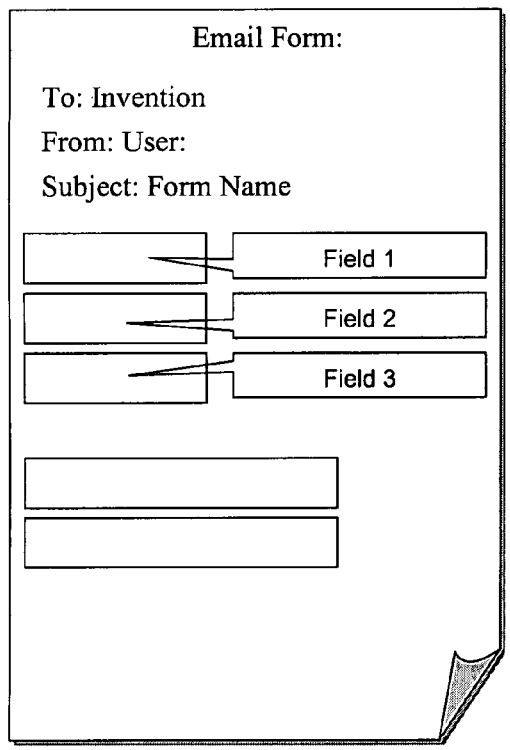
FIG. 4 depicts the present invention's multiple field form entries being recomposed into a search string.
Figure 6:
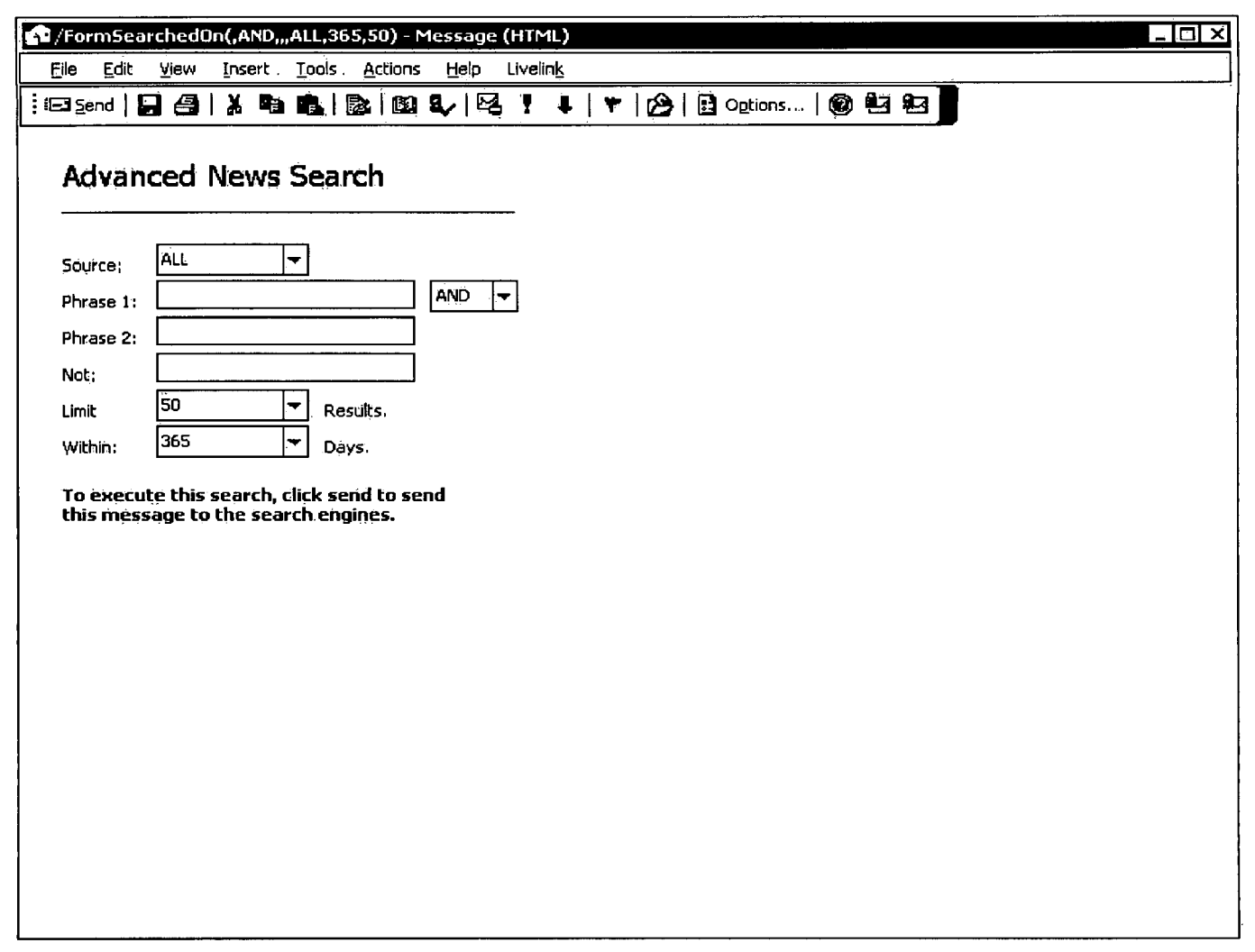

Still referring to FIG. 3, the purpose of the demodulation 220 is to obtain each of the parameters that the user entered on the form (see FIG. 4; see also FIG. 6). When an e-mail arrives that was generated by a form, each of the form fields are modulated (see FIG. 5) into the subject header to guarantee delivery of each of the fields regardless of the e-mail client used.

Figure 5:
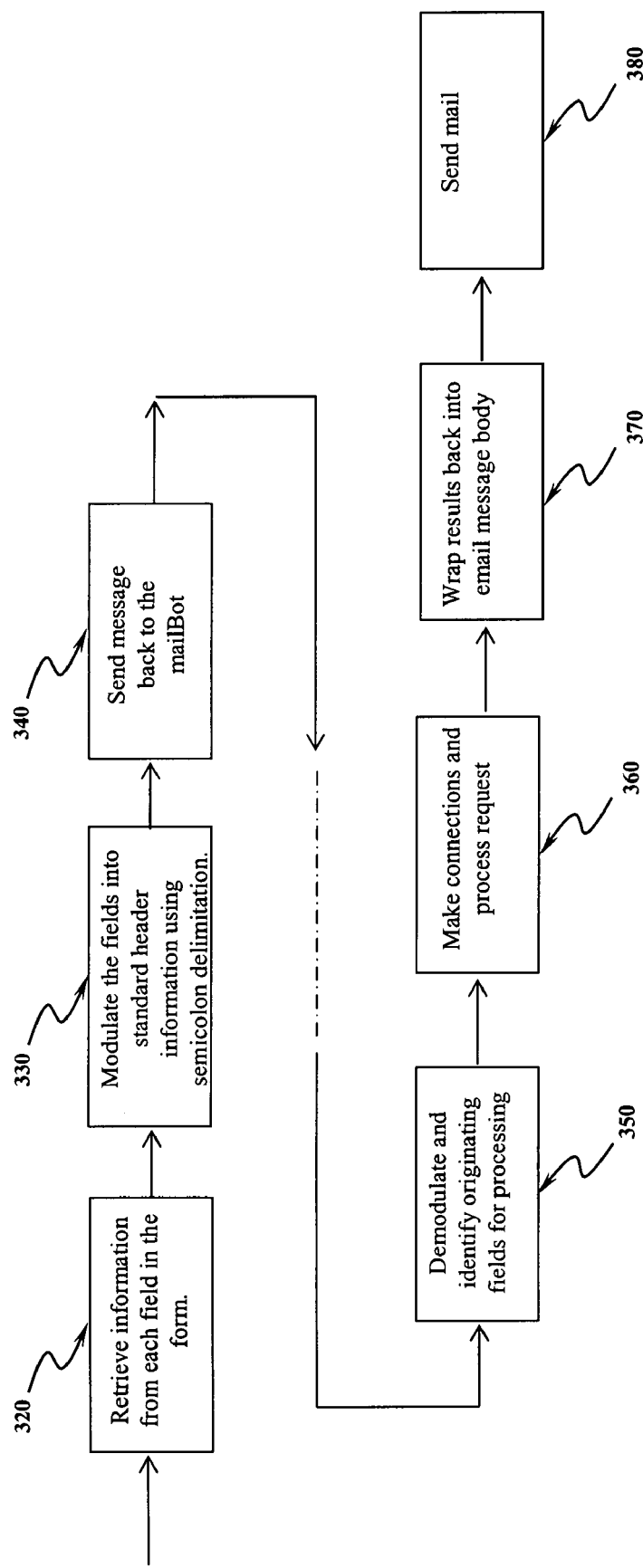
FIG. 5 depicts the process steps to modulate and demodulate the form entry fields into and out of a search string.

Referring briefly to FIG. 5 with regard to form-based searches or queries, to "modulate" the data, the present invention retrieves information from each field on the form 320. The field information is then combined, separated by comma delimitation, and organized into the subject header 330 and sent back 340. In "demodulation" of data, the present invention identifies and extracts useable variables in the subject header corresponding to the originating fields of the search form 350. API connections corresponding to the demodulated fields are made 360, the results are wrapped back into an e-mail body 370, and the request is sent to the processing API 380 (see also 200, FIG. 3).

Referring again to FIG. 3, if it is determined that the incoming request was not a form, the invention checks to see whether it is a process e-mail 230. The purpose of process e-mails is to allow the invention to make changes that differ from the originating request that require updating configuration, settings or the processing of additional requests 240. For example, it may be defined that the invention only return 10 results based on a specific search. If the user wants the next set of results, the same search can not be performed. In this case, another e-mail is sent to process the additional results, which will be returned in another e-mail. This process configuration can also be used to change configuration settings. For example, if a specific query is run daily, then an e-mail can be sent to the script creating a setting to run the same routine and e-mail the results on a temporal basis.

Figure 7:
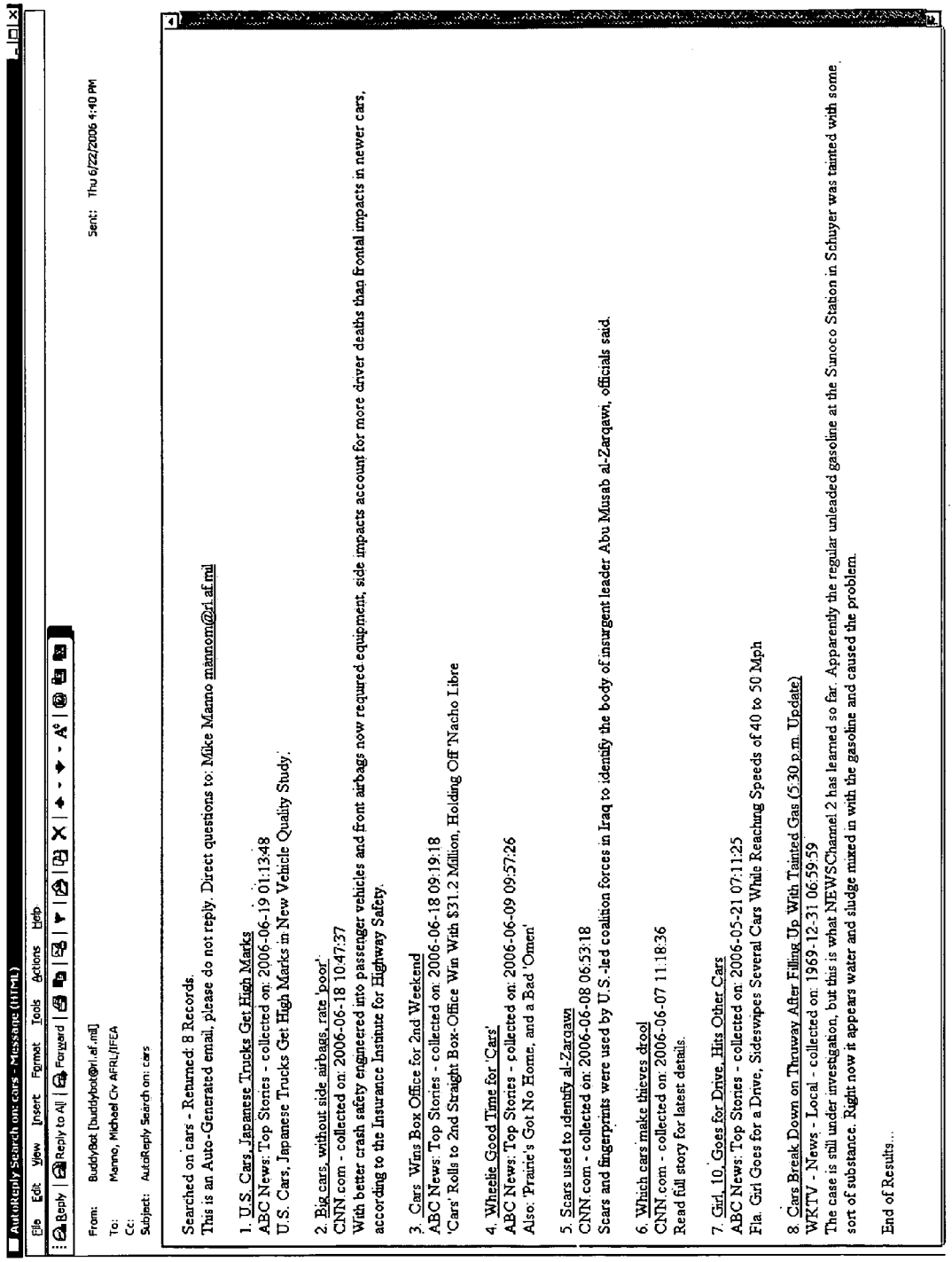
FIG. 7 depicts a multiple source results page as returned and formatted by the present invention.

If it is determined 230 that the request is not a process, but rather an e-mail, or e-mail form that has been demodulated, the next step is to run the request. The functionality of the invention is based on the request and the available sources and applications that are set up with it. Meaning, if a weather system provides an API to allow a user to download a weather forecast by zip code, and the invention can connect to that API, then the weather forecast can be delivered in an e-mail message based on the API connection 250. At this point the invention can, through connection to the API 250 connect up to any system or database that allows external access by the query/request 260 to retrieve the information. The databases and services (see 100, FIG. 2) can be localized or geographically separated over a network. Once the request is sent 260 and the results are returned, they must be organized in a format (see FIG. 7) that will cosmetically look well in an e-mail message body 270. If the results are just returned without this transformation, the results may be unreadable. Before the invention sends out any e-mail, the outgoing e-mail address and headers are verified 280. This is important to prevent infinite e-mail loops if a message is bounced back. When the invention sends a message it first verifies the e-mail address is valid. However, the message that it sends can still be returned. Before sending another message the invention determines if the message meets certain flags to quit. These include not sending mails to any mail deamon. If a message is sent, and the message gets bounced back, the originator is now the mail deamon, and the script will not pursue that request. Also, the invention will not attempt to deliver messages that originated with certain subjects, such as an out of office reply. In this case, a message will be sent to the invention and perform the request. In the event that the out of office assistant is activated, the message will get delivered and the e-mail application will send another message to the invention with the out of office message. Since the invention does not know how to handle that undefined request, it will not respond to the assistant. Furthermore, the outgoing mail verification methods are also used for authentication to verify what domains, IP address, and e-mail prefix names have access to various information. For example, if user1@foobar.com does not have access to database 1, but does have access to database 2, any request from user1 to database 1 will be rejected. Additional authentication is provided as to methods of delivery of the form. Sensitive requests are required to be signed or encrypted, or password enabled. It is at this stage that the credentials are verified. The form will provide input for the username and password, and will only send the message to the invention if the message is encrypted, or signed, or both. If the outgoing message passes these tests, then the message is sent 290. To keep an audit trail of what information was delivered to what address, a log file is created 300. This file contains all of the information and headers of not only the original request, but the results as well. After all the previous steps are completed, the message is delivered 310.

Figure 8:
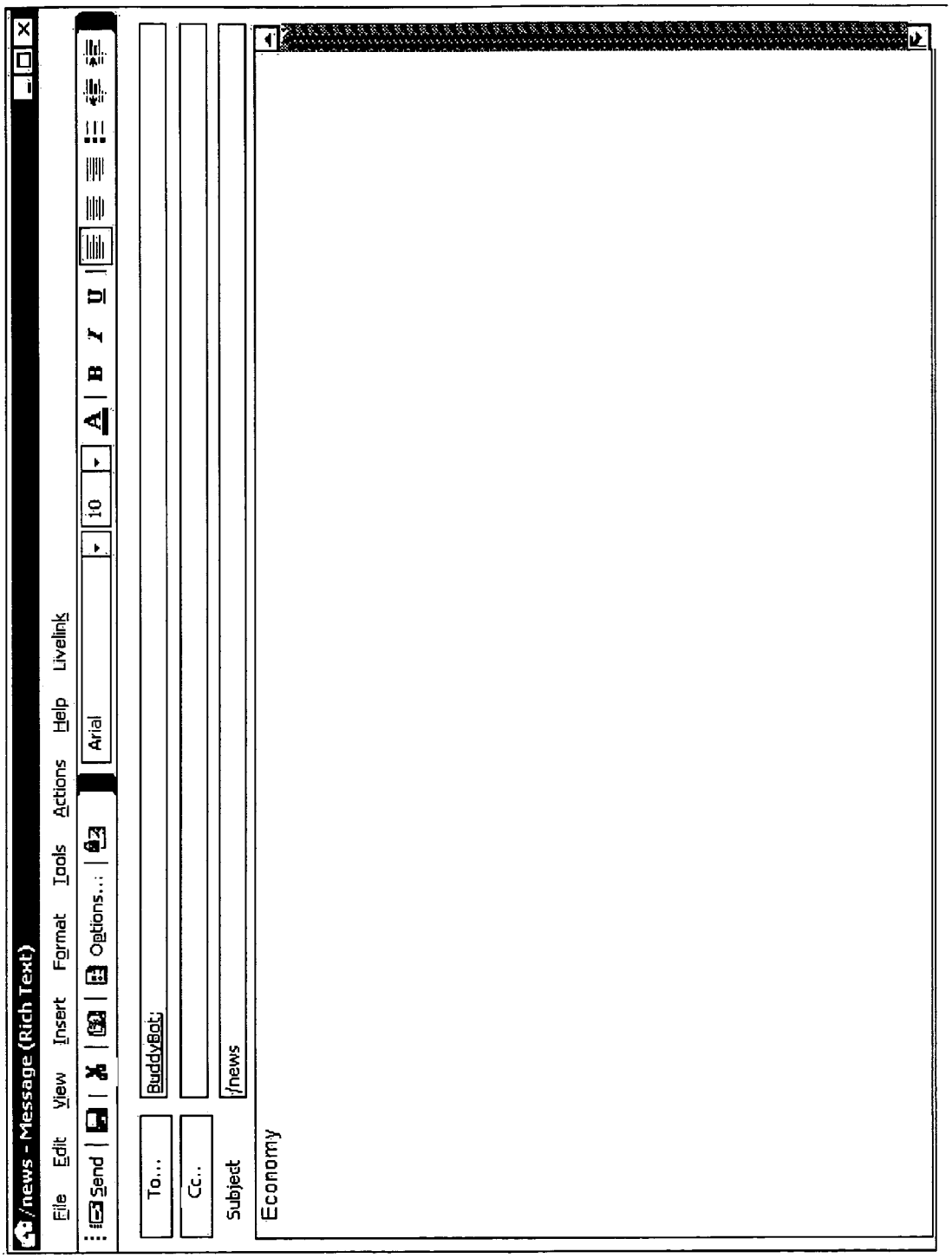
FIG. 8 depicts an actual screenshot of a text-only method of composing a search without the use of electronic forms.

Referring to FIG. 8 depicts a basic search that can also be performed by the present invention by placing the search term within the body of the e-mail message and the search category in the subject line. In this instance, the invention will modulate the contents of the e-mail message body (i.e., the search term) and the search category (i.e., the subject line term) onto the standard header of an outgoing e-mail to the domain specific server. API connections will be made and a synthetic document containing search results will be sent to the user (requestor) in a return e-mail in a similar manner as when the search is performed using electronic search forms.

While the present invention has been described in reference to specific embodiments, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

What is claimed is:

1. Method for information retrieval via electronic mail, comprising the steps of:
   creating an electronic information retrieval request;
   forwarding said retrieval request as an e-mail to a domain-specific mail server;
   parsing the incoming header and message body of said e-mail;
   storing said parsed incoming header information as a temporary variable;
   building an outgoing header from said stored parsed incoming header;
   determining whether said electronic information retrieval request originated as an e-mail, an e-mail electronic form, or a process e-mail;
   IF it is determined that said electronic information retrieval request originated as an e-mailed electronic form, THEN
      demodulating subject line corresponding to each field in said electronic form;
   OTHERWISE,
      IF it is determined that said electronic information retrieval request originated as a process request, THEN
         updating configuration;
         updating settings; and
         processing additional requests;
      OTHERWISE,
   making connections to APIs corresponding to particular databases to be searched;
   accessing a plurality of databases with said retrieval request;
   receiving returned results;
   building an outbound electronic message containing said returned results in an interpretable format;
   verifying the e-mail address and header of said outbound electronic message;
   authenticating said verified outbound electronic message;
   sending said verified outbound electronic message;
   maintaining an audit trail of said outbound electronic message being delivered to said verified e-mail address; and
   receiving said returned results within the body of said outbound electronic message.

2. In an information system comprising a plurality of local and remote databases and user workstations being electronically interconnected through a network with mail servers, an apparatus, being disposed between said network and said severs, for providing information retrieval from said local and remote databases via electronic mail to and from said user workstations, further comprising:
   a computer processor;
   a software program comprising instructions, stored on a computer-readable media, wherein said instructions, when executed by said computer processor, implement means to:
      create an electronic information retrieval request;

forward said retrieval request as an e-mail to a domain-specific mail server;

parse the incoming header and message body of said e-mail;

store said parsed incoming header information as a temporary variable;

build an outgoing header from said stored parsed incoming header;

determine whether said electronic information retrieval request originated as an e-mail, an e-mail electronic form, or a process e-mail;

IF it is determined that said electronic information retrieval request originated as an e-mailed electronic form, THEN demodulate subject line corresponding to each field in said electronic form;

OTHERWISE,

IF it is determined that said electronic information retrieval request originated as a process request, THEN update configuration;

update settings; and process additional requests;

OTHERWISE, make connections to APIs corresponding to particular databases to be searched;

access a plurality of databases with said retrieval request;

receive returned results;

build an outbound electronic message containing said returned results in an interpretable format;

verify the e-mail address and header of said outbound electronic message;

authenticate said verified outbound electronic message;

send said verified outbound electronic message;

maintain an audit trail of said outbound electronic message being delivered to said verified e-mail address; and receive said returned results within the body of said outbound electronic message.

\* \* \* \* \*